United States Patent
Jeon et al.

(10) Patent No.: US 7,577,168 B2
(45) Date of Patent: Aug. 18, 2009

(54) METHOD FOR DETECTING SYMBOL SYNCHRONIZATION AND APPARATUS THEREOF

(75) Inventors: Taehyun Jeon, Sungnam (KR); Heejung Yu, Daejeon (KR); Myung-Soon Kim, Daejeon (KR); Eun-Young Choi, Daejeon (KR); Sok-Kyu Lee, Daejeon (KR); Deuk-Su Lyu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 573 days.

(21) Appl. No.: 11/198,598

(22) Filed: Aug. 4, 2005

(65) Prior Publication Data

US 2006/0126670 A1 Jun. 15, 2006

(30) Foreign Application Priority Data

Dec. 10, 2004 (KR) ...................... 10-2004-0104356

(51) Int. Cl.
*H04J 3/06* (2006.01)
(52) U.S. Cl. ...................................... 370/509; 375/143
(58) Field of Classification Search ................. 370/203, 370/324, 503, 509
See application file for complete search history.

(56) References Cited

U.S. PATENT DOCUMENTS

| | | | | |
|---|---|---|---|---|
| 5,815,541 A * | 9/1998 | Fukushi | ...................... | 375/376 |
| 5,883,929 A * | 3/1999 | Wang et al. | .................. | 375/367 |
| 5,909,462 A * | 6/1999 | Kamerman et al. | ......... | 375/147 |
| 6,259,724 B1 * | 7/2001 | Esmailzadeh | .............. | 375/143 |
| 6,526,035 B1 * | 2/2003 | Atarius et al. | ................ | 370/342 |
| 6,549,564 B1 * | 4/2003 | Popovic | ...................... | 375/142 |
| 6,563,856 B1 | 5/2003 | O'Shea et al. | | |
| 6,567,482 B1 * | 5/2003 | Popovic' | ..................... | 375/343 |
| 6,859,899 B2 * | 2/2005 | Shalvi et al. | ................. | 714/701 |
| 7,020,218 B2 * | 3/2006 | Arnesen | ...................... | 375/316 |
| 7,023,928 B2 * | 4/2006 | Laroia et al. | ................ | 375/260 |
| 7,099,422 B2 * | 8/2006 | Hoctor et al. | ............... | 375/354 |

(Continued)

FOREIGN PATENT DOCUMENTS

EP 1049302 A1 * 11/2000

(Continued)

OTHER PUBLICATIONS

S.Nandula K.Giridhar, 'Robust timing synchronization for OFDM based wireless LAN system', Tencon 2003. Conference on Convergent Technologies for Asia-Pacific Region. vol. 4.

*Primary Examiner*—Ricky Ngo
*Assistant Examiner*—Ben H Liu
(74) *Attorney, Agent, or Firm*—Blakely, Sokoloff, Taylor & Zafman LLP

(57) ABSTRACT

An apparatus for detecting symbol synchronization in a received signal including a first preamble and a second preamble which is consecutive to the first preamble, the apparatus including a first correlator calculating a first correlation value between the received signal and a first pattern of a first period among iterative patterns of the first preamble, a second correlator calculating a second correlation value between the received signal and a second pattern of a second period among iterative patterns of the second preamble, a third correlator calculating a third correlation value between the first correlation value and the second correlation value, and a detector detecting symbol synchronization from the third correlation value.

17 Claims, 2 Drawing Sheets

U.S. PATENT DOCUMENTS

| | | | |
|---|---|---|---|
| 7,145,955 B1 * | 12/2006 | Bohnke et al. | 375/260 |
| 7,251,282 B2 * | 7/2007 | Maltsev et al. | 375/260 |
| 7,251,288 B2 * | 7/2007 | Imamura | 375/295 |
| 7,274,757 B1 * | 9/2007 | Zhou et al. | 375/340 |
| 7,349,461 B2 * | 3/2008 | Glazko et al. | 375/147 |
| 7,391,828 B2 * | 6/2008 | Liu et al. | 375/342 |
| 2005/0047384 A1 * | 3/2005 | Wax et al. | 370/338 |
| 2007/0211835 A1 * | 9/2007 | Inagawa et al. | 375/343 |

FOREIGN PATENT DOCUMENTS

| | | |
|---|---|---|
| KR | 2000-0077075 | 12/2000 |
| KR | 2001-0007391 | 1/2001 |
| WO | WO 00/54424 | 9/2000 |

* cited by examiner

METHOD FOR DETECTING SYMBOL SYNCHRONIZATION AND APPARATUS THEREOF

CROSS-REFERENCE TO RELATED APPLICATION

This application claims priority to and the benefit of Korean Patent Application 10-2004-0104356 filed in the Korean Intellectual Property Office on Dec. 10, 2004, the entire content of which is incorporated herein by reference.

BACKGROUND OF THE INVENTION (a) Field of the Invention

The present invention relates to a packet communication system, and more particularly to a method for detecting symbol synchronization and an apparatus thereof in the packet communication system.

(b) Description of the Related Art

A method for detecting symbol synchronization that detects timing of a received packet, that is, a boundary between a preamble and a payload or a boundary between preambles in different patterns, is a very important technology in a packet-based transmission system.

In particular, a symbol synchronization method is essential to find a start point of a Fast Fourier Transform (FFT) window for a modulation process by a receiver in an Orthogonal Frequency Division Multiplexing (OFDM) packet.

The symbol synchronization method includes a cross-correlation and an auto-correlation. The cross-correlation correlates a received signal with a known preamble signal, and the auto-correlation correlates a received signal with a delayed received signal. However, the auto-correlation may cause performance degradation due to an interference signal, and the cross-correlation may experience difficulties in detecting end portions of peak values when a large delay spreading value of a channel occurs.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

SUMMARY OF THE INVENTION

The present invention has been made in an effort to provide a method for detecting symbol synchronization in a packet communication system and an apparatus of the same having advantages of high reliability in symbol synchronization detection.

In one aspect of the present invention, an apparatus for detecting symbol synchronization in a received signal includes a first correlator, a second correlator, a third correlator, and a detector. The received signal includes a first preamble and a second preamble which is consecutive to the first preamble. The first correlator calculates a first correlation value between the received signal and a first pattern of a first period among iterative patterns of the first preamble. The second correlator calculates a second correlation value from the received signal and a second pattern of a second period among iterative patterns of the second preamble. The third correlator calculates a third correlation value from the first correlation value and the second correlation value. The detector detectes symbol synchronization from the third correlation value.

In another aspect of the present invention, a method for detecting symbol synchronization in a received signal includes calculating a channel power value from a first pattern of a first period among iterative patterns of the first preamble and a second pattern of a second period among iterative patterns of the second preamble, low-pass filtering the channel power value, and detecting symbol synchronization when an output value of the low-pass filtering exceeds a threshold value or when the output of the low-pass filtering reaches a peak value.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A method for detecting symbol synchronization and an apparatus thereof will now be described in detail with reference to the accompanying drawings.

Figure 1:
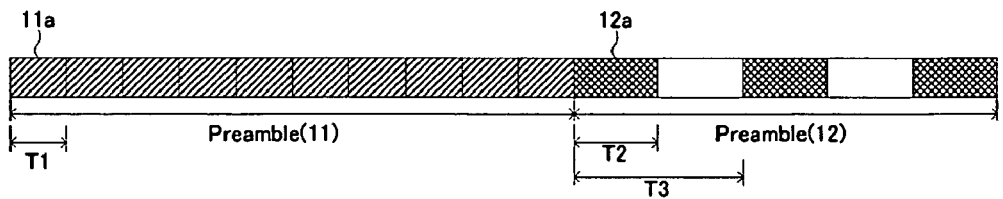
FIG. 1 illustrates a portion of a preamble in a frame structure of a received signal.

For better comprehension and ease of description, a method for detecting a boundary between two preambles in different iterative patterns as shown in FIG. 1 will be described. Boundaries between the respective symbols that form a whole packet may be detected based on the method.

As shown in FIG. 1, a preamble part in a received packet includes two preambles 11 and 12, each of which has a different iterative pattern. Assume that a pattern 11a with a length of T1 is iterated with a period of T1 in the preamble 11, and a pattern 12a with a length of T2 is iterated with a period of T3 in the preamble 12.

Figure 2:
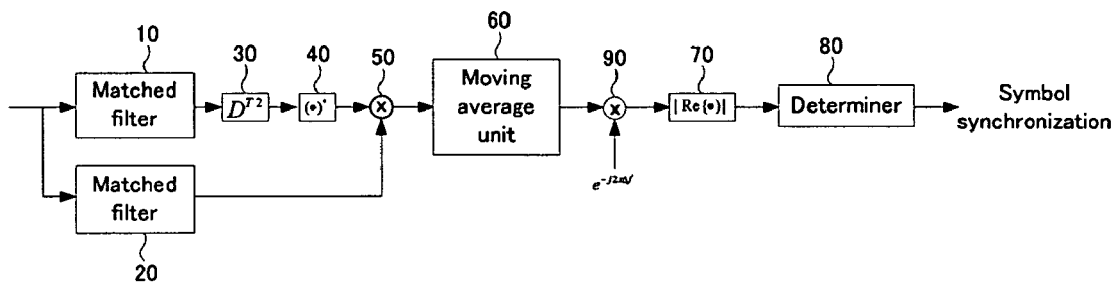
FIG. 2 is a schematic block diagram of a symbol synchronization detecting apparatus according to a first embodiment of the present invention.

In FIG. 2, the symbol synchronization detecting apparatus includes matched filters 10 and 20, a delaying unit 30, a complex conjugator 40, a correlator 50, a moving average unit 60, a real number generator 70, and a determiner 80 according to the first embodiment of the present invention. Herein, the moving average unit 60, the real number generator 70, and the determiner 80 are operated as a detector for detecting symbol synchronization in a correlation value of the correlator 50.

The matched filter 10 outputs a correlation value $x_k$ between a received signal $r_k$ and one period signal $a_k$ of the preamble 11 by multiplying a received signal $r_k$ by a matched filter coefficient. Herein, the matched filter coefficient corresponds to a value $a^*_{-k}$ which is obtained by inverting an order of the one period signal $a_k$ of the preamble 11 on the time axis, and complex-conjugating the inverted order. In other words, an output $x_k$ of the matched filter 10 is given by Equation 1.

$$x_k = r_k * a^*_{-k} \qquad \text{[Equation 1]}$$

Herein, the received signal $r_k$ may be expressed by a result of adding a transmission channel condition $h_k$ and noise $n_k$ to a preamble $a_k$ transmitted from a transmission terminal, as shown in Equation 2.

Thus, the correlation value $x_k$ between the received signal and the preamble 11 may be expressed as given in Equation 3.

$$r_k = a_k * h_k + n_k \qquad \text{[Equation 2]}$$

$$x_k = r_k * a^*_{-k} = (a_k * h_k + n_k) * a^*_{-k} = a_k * h_k * a^*_{-k} + n_k * a^*_{-k} \qquad \text{[Equation 3]}$$

If we assume that the auto-correlation of a preamble sequence is a delta function $\delta_k$, which is an ideal characteristic of a preamble, the correlation value $x_k$ between the received signal and the preamble 11 may be expressed as Equation 5. If we assume that interference and noise do not exist, the correlation value $x_k$ between the received signal and the preamble 11 become equivalent to a channel response coefficient $h_k$.

$$a_k * a^*_{-k} \approx \delta_k \qquad \text{[Equation 4]}$$

$$x_k \approx \delta_k * h_k + w_k = h_k + w_k \approx h_k \qquad \text{[Equation 5]}$$

The matched filter 20 outputs a correlation value $y_k$ between a received signal $r_k$ and a signal $b_k$ corresponding to a portion of the preamble 12 by multiplying the received signal $r_k$ by the matched filter coefficient, the portion $b_k$ corresponding to the length of T2 of one period signal of the preamble 12. In this instance, the matched filter coefficient corresponds to a value $b^*_{-k}$ which is obtained by inverting an order of the signal $b_k$ corresponding to the portion of T2 of one period of the preamble 12 on the time-axis and complex-conjugating the signal of the inverted order. In other words, an output $y_k$ of the matched filter 10 is given by Equation 6.

$$y_k = r_k * b^*_{-k} \qquad \text{[Equation 6]}$$

As above-described, if we assume that the auto-correlation of the preambles is the delta function, the correlation value $y_k$ between the received signal and the preamble 12 becomes the channel response coefficient $h_k$. In addition, if we assume that the preamble 12 starts when k=0, Equation 6 may be expressed as shown in Equation 7.

$$y_k \approx h_{k-T2} \qquad \text{[Equation 7]}$$

The delaying unit 30 delays the correlation value $x_k$ of the matched filter 10 by the length of T2, and the complex conjugator 40 outputs a complex conjugate value $(x_{k-T2})^*$ of a delayed correlation value $x_{k-T2}$. The correlator 50 outputs a correlation value $z_k$ between the output $(x_{k-T2})^*$ of the complex conjugator 40 and the output $y_k$ of the matched filter 20, and this correlation value $z_k$ is obtained by Equation 8. In other words, a power value of a channel is obtained by delaying output values of the matched filters 10 and 20 on the time-axis, rearranging the delayed output values, and correlating the rearranged output values.

$$z_k = y_k \cdot (x_{k-T2})^* \approx h_{k-T2} \cdot (x_{k-T2})^* = |h_{k-T2}|^2 \qquad \text{[Equation 8]}$$

The moving average unit 60 calculates a moving average value $m_k$ having a window size that corresponds to one period T1 of the preamble 11 with respect to the correlation value $z_k$. A frequency response characteristic of such a moving average unit 60 becomes a sinc function (i.e., a function proportional to sin(T1*f)/(T1*f)). Herein, the sinc function is operated as a low-pass filter. A bandwidth of the low-pass filter is inversely proportional to a window size T1 of the moving average unit 60. In other words, when the window size of the moving average unit 60 is increased, the bandwidth is reduced and thus noise is remarkably reduced.

$$m_k = \sum_{i=0}^{T1-1} z_{k-i} \approx \sum_{i=0}^{T1-1} |h_{k-i-T2}|^2 \qquad \text{[Equation 9]}$$

The real-number generator 70 takes an absolute value $|\text{Re}\{m_k\}|$ of a real number value of the moving average value $m_k$ as shown in Equation 10, and the determiner 80 detects symbol (or frame) synchronization when the absolute value exceeds a threshold value. The threshold value is determined to be equivalent to a half of the channel power value, and a channel power may be measured by channel estimation. The determiner 80 may detect symbol synchronization when the absolute value $|\text{Re}\{m_k\}|$ reaches a peak value, in addition to the case when the absolute value $|\text{Re}\{m_k\}|$ exceeds the threshold value. Herein, durations of start and end points for detecting a peak value may be predetermined to enhance performance of symbol synchronization detection.

In addition, the symbol synchronization detecting apparatus may further include a frequency corrector 90 correcting a frequency offset when the frequency offset is generated due to a carrier. The frequency corrector 90 corrects the frequency offset by multiplying the moving average value $m_k$ by a frequency correction value $e^{-T2\pi\Delta f}$. Herein, $\Delta f$ is a correction frequency.

Figure 3:
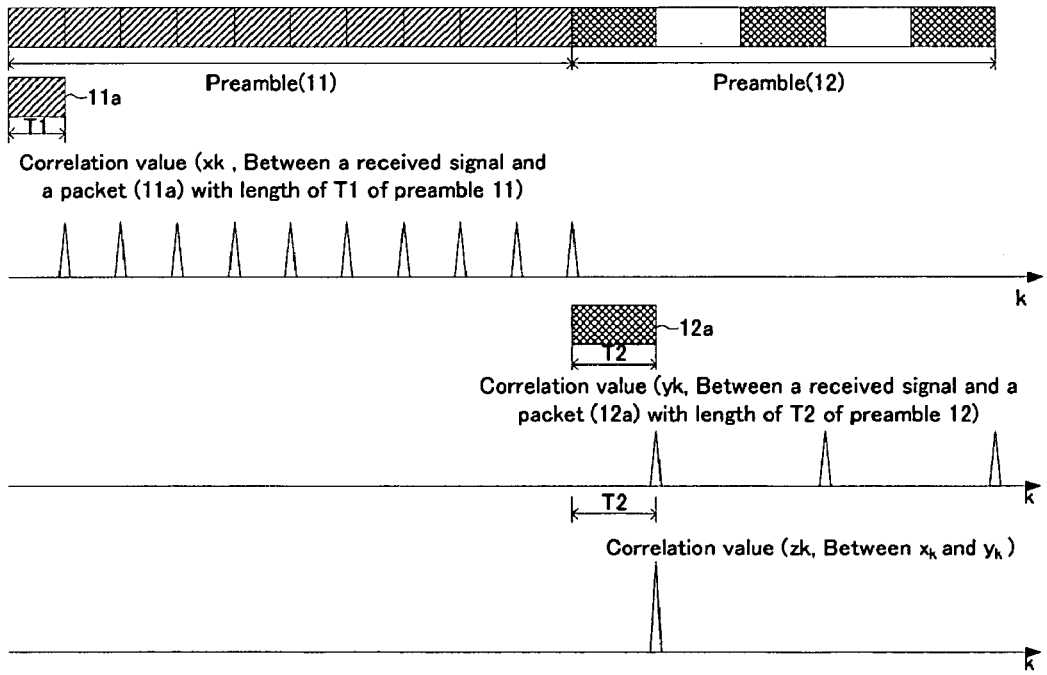
FIG. 3 shows a correlation value in the preamble of FIG. 1.
Figure 4:
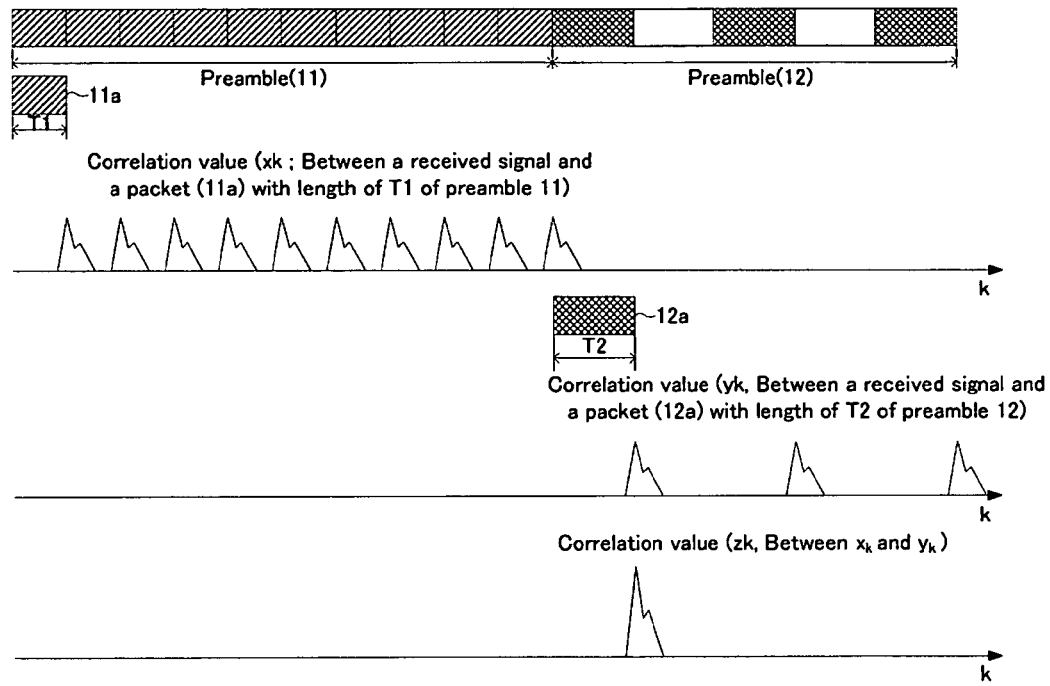
FIG. 4 shows correlation values in the preamble of FIG. 1 in consideration of influence of a channel.

With reference to FIG. 3 and FIG. 4, the correlation value between the received signal and the preamble iteratively corresponds to a channel response coefficient $h_k$ when a period of the iterative packet 11a and a period of the packet 12a of the preambles 11 and 12 are equal to each other. In addition, the correlation value of output values from two matched filters is given as a form of a power value $|h_{k-T2}|^2$ of a channel which has been delayed by length of T2 from a boundary between the preambles 11 and 12. Here, the T2 is a period of iterative patterns of the preamble 12, and the preambles 11 and 12 have different iterative patterns.

According to the first embodiment of the present invention, a cross-correlation value of the preamble and the received signal is obtained by using the matched filter, but it may be obtained by using other methods.

In the first embodiment of the present invention, when preambles different in patterns are arranged consecutive to a starting part of a packet, a power value of a channel detected by cross-correlating cross-correlation values which have been obtained between the received signal and the respective preambles is used to detect the symbol synchronization. Accordingly, the symbol synchronization may be reliably detected in a channel where interference and noise are unavoidable.

Figure 5:
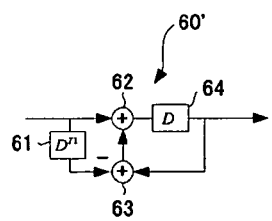
FIG. 5 is a schematic block diagram of a moving average unit of a symbol synchronization detecting apparatus according to a second embodiment of the present invention.

The symbol synchronization detecting apparatus of FIG. 2 requires (T1−1) number of delaying units (in this instance, registers) and (T1−1) number of adders to calculate a moving average value for a window with the size of T1. A method for reducing the number of adders in the symbol synchronization detecting apparatus of FIG. 2 will now be described with reference to FIG. 5. FIG. 5 is a schematic diagram of a moving average unit 60′ of a symbol synchronization detecting apparatus according to a second embodiment of the present invention.

As shown in FIG. 5, the moving average unit 60' includes delaying units 61 and 64, an adder 62, and a subtracter 63. The delaying unit 61 delays a correlation value $z_k$ by the length of T1 and outputs the delayed correlation value, and the subtracter 63 subtracts an output $z_{k-T1}$ of the delaying unit 61 from an output of the moving average unit 60'. The output of the moving average unit 60' corresponds to an output of the delaying unit 64. The adder 62 adds the correlation value $z_k$ and an output of the subtracter 63, and outputs an added result to the delaying unit 64. The output of the delaying unit 64 becomes a moving average value $m_k$ as shown in Equation 9.

The reason that an output of the moving average unit 60' of FIG. 5 becomes a moving average value will now be described. Assume that the output of the moving average unit 60' is given as Equation 9, and the correlation value $z_k$ is input to the moving average unit 60'. An output of the subtracter 63 becomes $m_{k-1} - z_{k-T1}$, and an output $m_k$ of the adder 62 is calculated by Equation 10. In other words, the output of the moving average unit 60' corresponds to a sum of T1 number of correlation values, in a like manner of a previous output of the moving average unit 60'.

$$m_k = m_{k-1} - z_{k-T1} + z_k = \left(\sum_{i=0}^{T1-1} z_{k-1-i}\right) - z_{k-T1} + z_k = \sum_{i=0}^{T1-1} z_{k-i}$$ [Equation 10]

As described, the moving average unit 60' outputs a moving average value which corresponds to the sum of T1 number of correlation values $z_k$. Similar to the moving average unit 60 of the first embodiment, the moving average unit 60' requires (T1+1) number of delaying units (registers). However, the number of adders may be remarkably reduced compared to the moving average unit 60 of the first embodiment since the moving average unit 60' requires one adder 62 and one subtracter 63.

Figure 6:
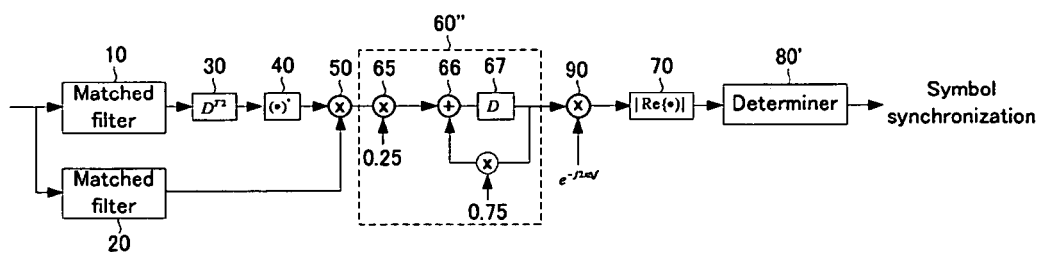
FIG. 6 is a schematic block diagram of a symbol synchronization detecting apparatus according to a third embodiment of the present invention.

A method for reducing the number of delaying units will be described in comparison with the first and second embodiments of the present invention, with reference to FIG. 6. FIG. 6 is a schematic block diagram of a symbol synchronization detecting apparatus according to third embodiment of the present invention.

As shown in FIG. 6, the symbol synchronization detecting apparatus includes what the symbol synchronization detecting apparatus of FIG. 1 includes except for a low-pass filter 60'' and a determiner 80'. The moving average unit 60 and the determiner 80 in the symbol synchronization detecting apparatus of FIG. 2 are respectively replaced with the low-pass filter 60'' and the determiner 80' that detects a peak value in the symbol synchronization detecting apparatus of FIG. 6.

In more detail, the low-pass filter 60'' includes multipliers 65 and 68, an adder 66, and a delaying unit 67. The multiplier 65 multiplies the correlation value by a first coefficient (e.g., 0.25), and the multiplier 68 multiplies an output $m'_{k-1}$ of the delaying unit 67 by a second coefficient (e.g., 0.75). The adder 66 adds outputs of the multipliers 65 and 68 and outputs an adding result, and the delaying unit 67 delays an output of the adder 66 and outputs a delayed output as an output $m'_k$ of the low-pass filter 60'' Herein, the first and second coefficients are positive numbers less than 1, and the second coefficient is greater than the first coefficient.

Thus, the output $m'_k$ of the low-pass filter 60'' is given by Equation 11. When the output $m'_k$ is converted into a frequency-domain value, the output $m'_k$ is given in a form which is similar to the above-described moving average.

$$m'_k = 0.75 m'_{k-1} + 0.25 z_k$$ [Equation 11]

The determiner 80' detects a peak value of an absolute value of a real number part in the output $m'_k$ of the low-pass filter 60'', and finds symbol synchronization (or frame synchronization) with reference to the absolute value at the peak value.

In addition, similar to the determiner 60 in the first and second embodiments, the determiner 80' may detect symbol synchronization when the absolute value $|Re\{m'_k\}|$ of the real number part exceeds the threshold value.

As described, the number of delaying units may be reduced compared to that of the second embodiment since the moving average may be calculated using one delaying unit according to the third embodiment of the present invention.

According to the embodiments of the present invention, cross-correlation values are obtained between a received signal and each preamble pattern, and a channel power value is obtained by cross-correlating the cross-correlation values to thereby detect symbol synchronization using the channel power value. Accordingly, the symbol synchronization may be reliably detected in a channel where interference and noise are unavoidable.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for detecting symbol synchronization in a received signal including a first preamble and a second preamble which is consecutive to the first preamble, the apparatus comprising:
    a first correlator calculating a first correlation value between the received signal and a first pattern of a first period among iterative patterns of the first preamble;
    a second correlator calculating a second correlation value from the received signal and a second pattern of a second period among iterative patterns of the second preamble;
    a third correlator calculating a third correlation value from the first correlation value and the second correlation value; and
    a detector detecting symbol synchronization from the third correlation value.

2. The apparatus of claim 1, wherein the detector comprises a moving average unit calculating a moving average value using a sum of the third correlation values during the first period, and a determiner detecting symbol synchronization when the moving average value exceeds a threshold value.

3. The apparatus of claim 1, wherein the detector comprises a moving average unit calculating a moving average value using a sum of the third correlation values during the first period, and a determiner detecting symbol synchronization when the moving average value reaches a peak value.

4. The apparatus of claim 2, wherein the moving average unit comprises:
    a first delaying unit delaying the third correlation value by the first period;
    a first adder adding an output of the first delaying unit and an output of the moving average unit;
    a second adder adding the third correlation value and an output of the first adder; and
    a second delaying unit delaying an output of the second adder and outputting a delayed output as an output of the moving average unit.

5. The apparatus of claim 2, wherein the detector comprises a low-pass filter performing low-pass filtering of the third correlation value, and a determiner detecting symbol synchronization when an output of the low-pass filter reaches a peak value.

6. The apparatus of claim 2, wherein the detector comprises a low-pass filter performing low-pass filtering of the third correlation value, and a determiner detecting symbol synchronization when an output of the low-pass filter exceeds a threshold value.

7. The apparatus of claim 5, wherein the detector comprises:
   a first multiplier multiplying the third correlation value by a first coefficient;
   a second multiplier multiplying an output of the moving average unit by a second coefficient;
   an adder adding an output of the first multiplier and an output of the second multiplier; and
   a delaying unit delaying an output of the adder and outputting a delayed output as an output of the moving average unit.

8. The apparatus of claim 7, wherein the first coefficient is set to be 0.25 and the second coefficient is set to be 0.75.

9. The apparatus of claim 1, wherein the third correlator calculates the third correlation value by using a product of a complex conjugated value of the first correlation value and the second correlation value, the first correlation value being delayed by the second period.

10. The apparatus of claim 9, wherein the first and second correlators calculate the first and second correlation values by using a matched filter, respectively.

11. The apparatus of claim 10, wherein a matching coefficient of the matched filter of the first correlator corresponds to a value which is obtained by inverting an order on the time-axis of the first pattern of the first preamble and complex-conjugating the inverted order, and a matching coefficient of the matched filter of the second correlator corresponds to a value which is obtained by inverting an order on the time-axis of a second pattern of the first preamble and complex conjugating the inverted order.

12. The apparatus of claim 2, wherein the detector further comprises a frequency corrector multiplying an input of the determiner by a frequency correcting value.

13. A method for detecting symbol synchronization in a received signal including a first preamble and a second preamble which is consecutive to the first preamble, the method comprising:
   calculating a channel power value from a first pattern of a first period among iterative patterns of the first preamble and a second pattern of a second period among iterative patterns of the second preamble, calculating a moving average value of the channel power value within a predetermined window; and
   detecting symbol synchronization when the moving average value exceeds a threshold value or when the moving average value reaches a peak value.

14. The method of claim 13, wherein a size of the window corresponds to the first period.

15. A method for detecting symbol synchronization in a received signal including a first preamble and a second preamble which is consecutive to the first preamble, the method comprising:
   calculating a channel power value from a first pattern of a first period among iterative patterns of the first preamble and a second pattern of a second period among iterative patterns of the second preamble;
   low-pass filtering the channel power value; and
   detecting symbol synchronization when an output value of the low-pass filtering exceeds a threshold value or when the output of the low-pass filtering reaches a peak value.

16. The method of claim 13, wherein the calculating of the channel power value comprises, calculating a first correlation value by cross-correlating the received signal and the first pattern;
   calculating a second correlation value by cross-correlating the received signal and the second pattern; and
   calculating a third correlation value by cross-correlating the first correlation value and the second correlation value.

17. The method of claim 16, wherein the third correlation value is calculated from cross-correlation between a first correlation delayed by the second period and the second correlation value.

* * * * *